March 20, 1956 — E. J. BEACH — 2,738,877
COMBINED OIL PURIFIER AND WATER SEPARATOR
Filed July 17, 1953 — 3 Sheets-Sheet 1

INVENTOR.
EDWARD J. BEACH
BY
ATTORNEY

March 20, 1956  E. J. BEACH  2,738,877
COMBINED OIL PURIFIER AND WATER SEPARATOR
Filed July 17, 1953  3 Sheets-Sheet 2

INVENTOR.
EDWARD J. BEACH
BY
ATTORNEY

March 20, 1956 E. J. BEACH 2,738,877
COMBINED OIL PURIFIER AND WATER SEPARATOR
Filed July 17, 1953 3 Sheets-Sheet 3
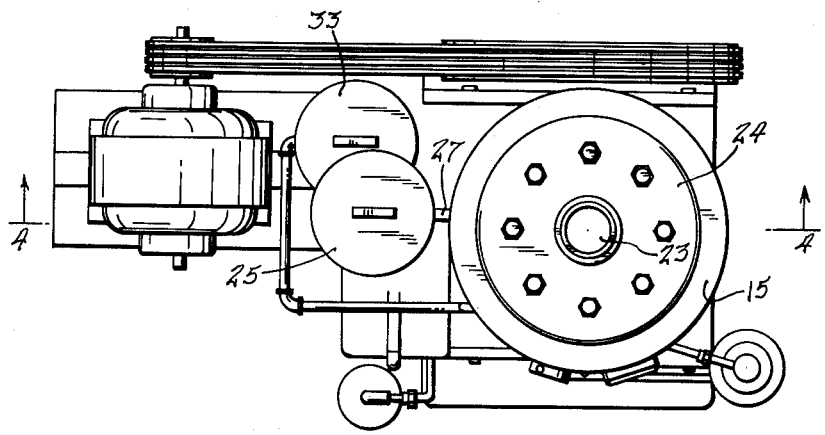
Fig. 3.
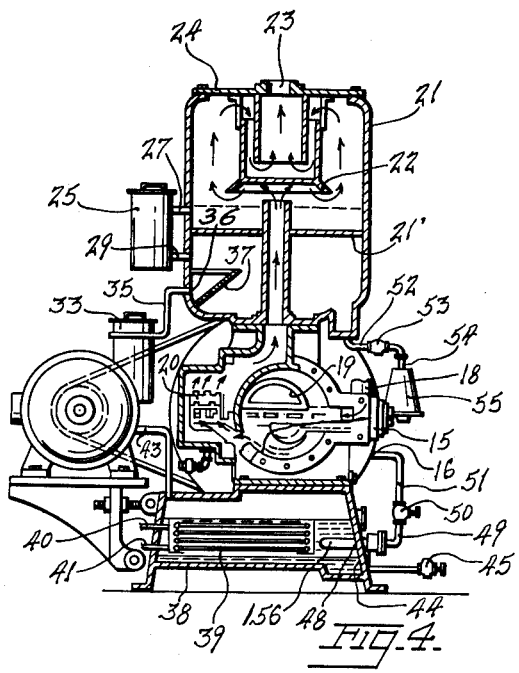
Fig. 4.
INVENTOR.
EDWARD J. BEACH
BY
ATTORNEY United States Patent Office 2,738,877
Patented Mar. 20, 1956

2,738,877

COMBINED OIL PURIFIER AND WATER SEPARATOR

Edward J. Beach, Brooklyn, N. Y., assignor to Beach-Russ Company, New York, N. Y., a corporation of New York Application July 17, 1953, Serial No. 368,590

11 Claims. (Cl. 210—44)

This invention relates to new and useful improvements in oil cleaners or separators to remove water and other impurities from oil.

More particularly, the present invention proposes the construction of a combination oil re-purifier, water-oil separator, and automatic lubricator which can be used in connection with any machine but which will be particularly useful in connection with a vacuum pump where large quantities of water are drawn into the pump and a final high vacuum is required.

Another object of the present invention proposes forming an oil separator device which will filter oil emulsion from a pump discharge, separate water from the oil, screen the dehydrated oil, refilter the oil, complete the dehydration so that the clean oil may be recirculated through the pump or pumped to the machine requiring the oil for a complete, continuous purification cycle.

Still further, the present invention proposes constructing the oil separator so that once the pump is started there will be a continuous complete purification cycle of filtering, dehydrating and removal of contamination which requires little or no attention and produces fine filtration at high speeds and continuous flow without wool, waste, excelsior, bone black charcoal, sawdust or other similar filtering material which might escape and clog a machine.

As a further object, the present invention proposes arranging the separator device components vertically for compactness to save floor space and for easy removal and cleaning of the filtering elements without interfering with the continuous operation of the device and so that the oil is always flowing downhill.

The present invention further proposes a novel arrangement of the filtering units in the separator so that the filtering bags in such units may be easily and quickly changed for renewal or washing and can be re-used many times, all without disconnecting any pipes, and so that oil passes outwardly from an innermost nestled filter bag to the outermost bag.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a top plan view of the structure shown in Fig. 1.

Fig. 4 is a sectional view taken on line 4—4 of Fig. 3.

Figure 1:
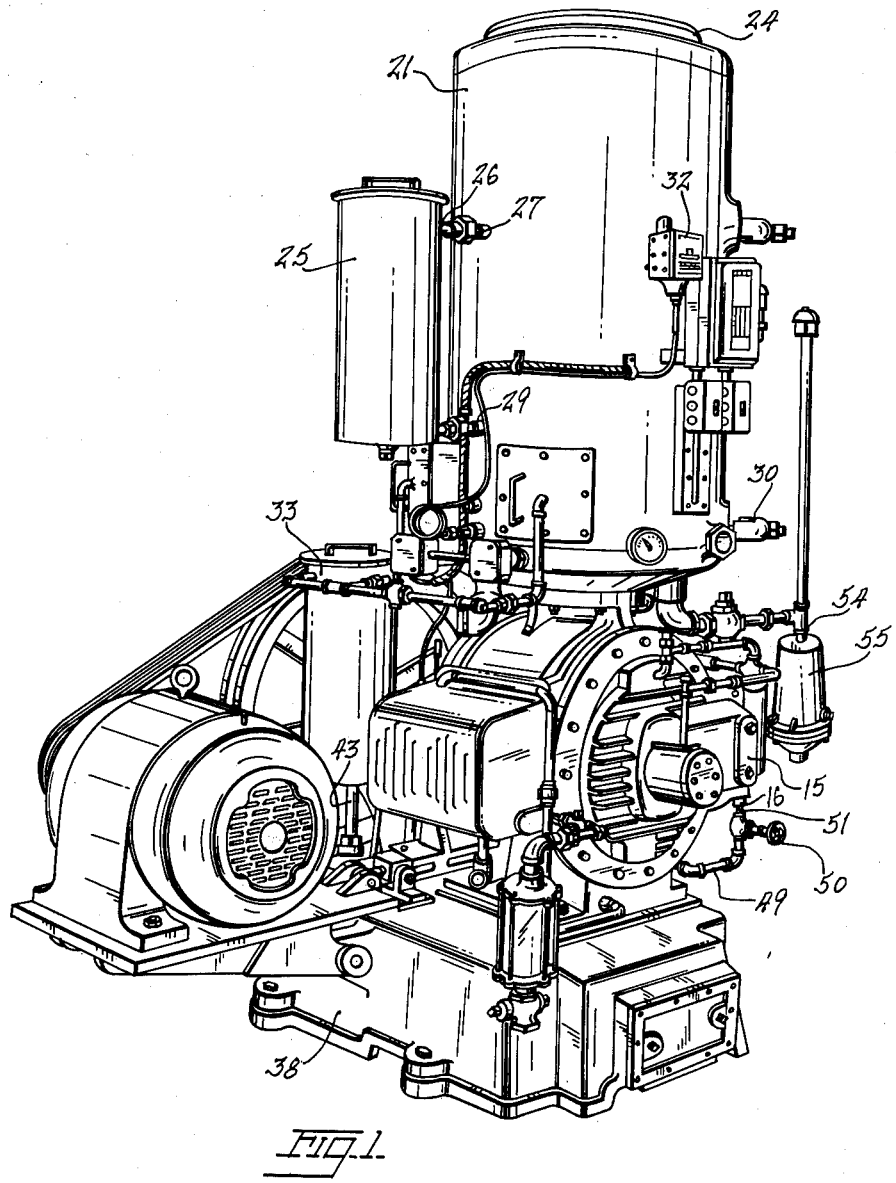
Fig. 1 is a perspective view of a motor driven vacuum pump with an oil separator device constructed and arranged in accordance with the present invention.
Figure 2:
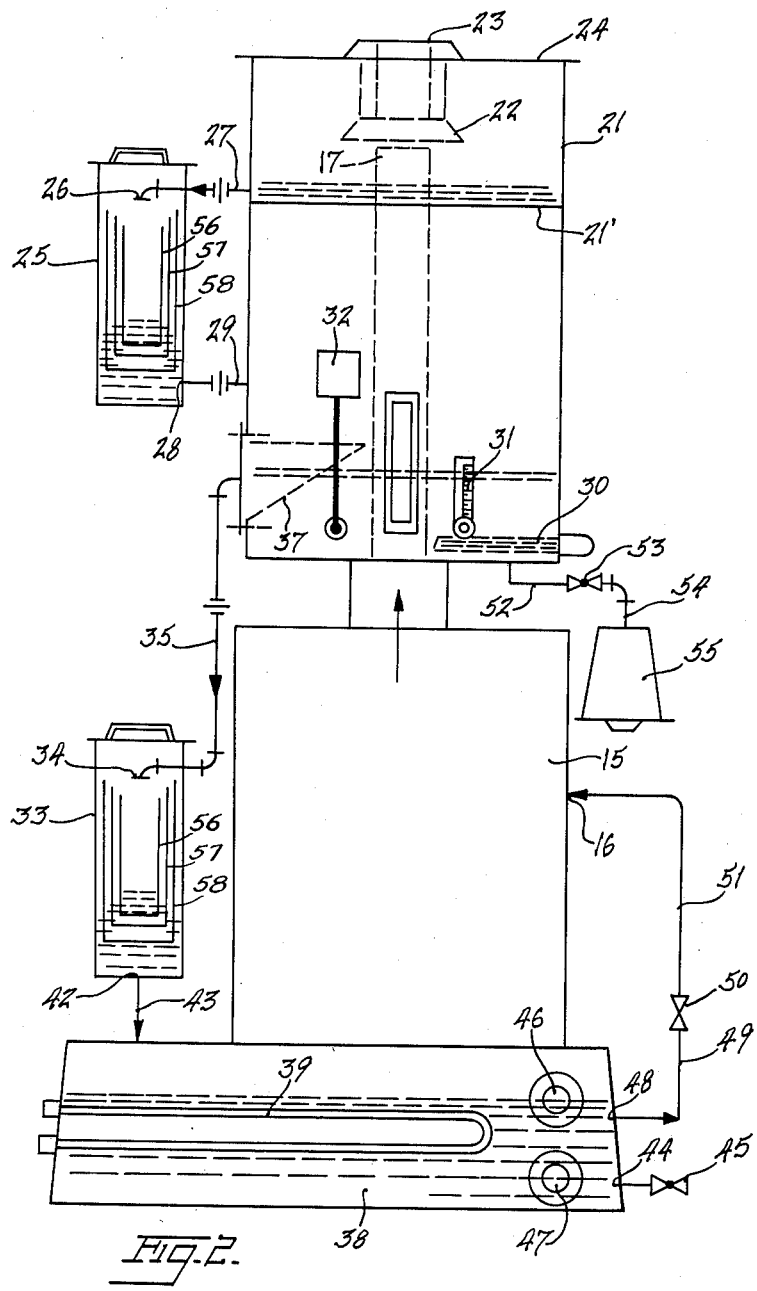
Fig. 2 is a diagrammatic view of the structure shown in Fig. 1.

Referring more particularly to the drawings, the device has a pump 15 which may be a separate pump but in the example of the drawings is a vacuum pump. Pump 15 has an intake 16 for clean oil and an outlet 17 for oil-air mixtures such as are commonly present in many vacuum processes where appreciable quantities of solvent or water vapor evacuated from the system must be handled by the pump. The pump also has a vacuum drawing inlet connection 18 (see Fig. 4), a rotor 19, and oil immersed discharge valves 20.

An upper water-oil separator 21 is disposed on top of the pump 15, the outlet 17 of the pump extending up into this separator. An inverted cone-shaped baffle 22 is secured to the upper separator 21 in the separator above and adjacent the pump outlet 17. The upper separator 21 has a clean air exhaust 23 above the baffle 22 and in the top 24 of the separator.

An upper filter unit 25 is fastened to the upper separator 21, the unit having an upper inlet opening 26 connected by pipe 27 with the inside of the upper separator 21 below and adjacent the baffle 22. The filter unit 25 also has a lower outlet opening 28 connected by pipe 29 with the inside of the lower part of the upper separator 21. A partition 21' across the upper separator 21 between the upper inlet opening 26 and the lower outlet opening 28 of the upper filter unit 25 divides the upper separator 21 into separate upper and lower parts.

An electric immersion-type heater 30 extends into the lower part of the upper separator 21 to provide means to heat the contents of this part of the upper separator. A temperature gauge 31 is provided on the outside of the upper separator extending inside to determine the temperature therein visually and a thermostat control unit 32 is provided on the upper separator 21 operatively connected with the immersion heater 30 to control it automatically.

A lower filter unit 33 is connected to the upper separator 21 below the upper filter unit 25. The lower filter unit 33 has an upper inlet opening 34 connected by pipe 35 with the lower part of the upper separator 21. Around the lower filter unit connection 36 in the lower part of the upper separator 21 is a corrosion resistant screen 37 to screen or strain oil passing from the upper separator 21 into the lower filter unit 33.

Beneath the pump 15 is a lower water-oil separator 38 which forms the base of the apparatus. A cooling coil 39 is disposed in the lower separator 38 with a cooling water inlet connection 40 and outlet connection 41 extending from this separator. The lower filter unit 33 has a lower outlet 42 connected by pipe 43 with the lower water-oil separator 38.

The lower water-oil separator 38 also has a drain 44 with a drain cock 45, a pump oil gauge 46, and a water-oil gauge 47, these gauges being disposed in the upper and lower parts of this separator, respectively.

A clean oil outlet 48 from the upper part of the lower water-oil separator 38 is connected by pipe 49, shut-off valve 50 and pipe 51 to the intake 16 of the pump.

Connected with the inside bottom of the upper separator 21 by pipe 52, valve 53 and pipe 54, is an automatic water-oil separator to permit draining of water from the upper separator. A strainer 156 (Fig. 4) is provided in the lower water-oil separator 38 over the clean oil outlet 48.

Filter units 25 and 33 are similarly constructed, each having three vertically disposed filter bags 56, 57 and 58 nestled in and spaced from one another with the inlet openings 26 and 34 of the filter units disposed over the center bag 56 in each filter unit. Preferably the bags are made of specially woven filtering cloth removably secured to a retainer ring, each bag being held in the filter unit separate from the other and each being capable of being turned inside out for washing. With bags having a filtering surface of about three square feet, filtering capacity of approximately six gallons per hour per set of bags is possible.

In operation, oil-air mixtures containing water vapor and other impurities leaves the pump 15 through outlet 17. As the mixture rises in the upper separator 21 it hits the underside of the inverted cone-shaped baffle 22. Oil, water, and other impurities drop into the upper separator 21 while clean air is exhausted out the clear air exhaust 23 above the baffle 22. The oil emulsion is then filtered through the upper filter unit 25 removing dirt, grit, and any small abrasive matter, carbon particles, or other solid impurities in the oil.

From the first or upper filter, the oil flows to the lower part of the upper separator 21 which preferably is thermostatically heated by immersion heater 30 between 165° to 175°. This rapidly separates most of the water from the oil. The dehydrated oil flows through the fine mesh, non-corrosive screen 37 preferably of 325 mesh or finer, to the lower filter unit 33 which removes any solid foreign matter still present in the oil. This screen is fine enough for the oil to go through it but water can not pass through this fine screen.

The oil flows from the lower filter unit 33 into the lower water-oil separator 38 where the cold water fed cooling coil 39 cools and settles the oil before it is returned to the pump. The strainer 156 makes the final screening of the oil as it is returned to the intake of the pump to go through the cycle again.

This arrangement eliminates the need of separate oil reclaiming units, centrifuges, etc. It also eliminates contamination of pump oil by condensed vapors; it assures continuous maximum pumping speeds, assures high volumetric efficiencies which means economical operation; the water and other vapors upon condensing in the pump always contaminate the oil and impair operating efficiencies and the desired low pressure can no longer be obtained and pumping time is increased.

This arrangement provides a rotary high vacuum pump that maintains top pumping efficiencies even when handling condensable vapors.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An oil separator device for separating water and other impurities from oil, comprising a pump having an intake and an outlet, and upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, and a clean oil outlet in the upper part of the lower water-oil separator connected with the intake of the pump.

2. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrision resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, and a water-oil separator connected with the lower part of the upper separator for draining water therefrom.

3. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, and a clean oil outlet in the upper part of the lower water-oil separator connected with the intake of the pump, said baffle being inverted cone shape and said means to cool and settle the contents of the lower water-oil separator being a cooling coil disposed in said separator with cooling water inlet and outlet connections extending from said separator.

4. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, and a water-oil separator connected with the lower part of the upper separator for draining water therefrom, said baffle being inverted cone shape and said means to cool and settle the contents of the lower water-oil separator being a cooling coil disposed in said separator with cooling water inlet and outlet connections extending from said separator.

5. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, and a strainer in the lower water-oil separator over the clean oil outlet.

6. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, a water-oil separator connected with the lower part of the upper separator for draining water therefrom, and a strainer in the lower water-oil separator over the clean oil outlet.

7. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, a water-oil separator connected with the lower part of the upper separator for draining water therefrom, and a strainer in the lower water-oil separator over the clean oil outlet, said baffle being inverted cone shape and said means to cool and settle the contents of the lower water-oil separator being a cooling coil disposed in said separator with the cooling water inlet and outlet connections extending from said separator, said means to heat the lower part of the upper separator being thermostatically controlled electric heaters extending in said separator.

8. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, and a clean oil outlet in the upper part of the lower water-oil separator connected with the intake of the pump, said filter units each having a plurality of vertically disposed filter bags nestled in and spaced from one another with the inlet opening of each filter unit being disposed over the center filter bag therein.

9. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, and a water-oil separator connected with the lower part of the upper separator for draining water therefrom, said filter units each having a plurality of vertically disposed filter bags nestled in and spaced from one another with the inlet opening of each filter unit being disposed over the center filter bag therein.

10. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, and a clean oil outlet in the upper part of the lower water-oil separator connected with the intake of the pump, said baffle being inverted cone shape and said means to cool and settle the contents of the lower water-oil separator being a cooling coil disposed in said separator with cooling water inlet and outlet connections extending from said separator, said filter units each having a plurality of vertically disposed filter bags nestled in and spaced from one another with the inlet opening of each filter unit being disposed over the center filter bag therein.

11. An oil separator device for separating water and other impurities from oil, comprising a pump having an intake and an outlet, an upper water-oil separator, a baffle in said upper separator above and adjacent the pump outlet, an air exhaust above the baffle in the upper separator, an upper filter unit having an upper inlet opening connected with the upper separator below and adjacent the baffle and a lower outlet opening connected with the lower part of the upper separator, a partition across the upper separator between the upper and lower openings of the upper filter unit, means to heat the lower part of the upper separator, a lower filter unit having an upper inlet opening connected with the lower part of the upper separator, a corrosion resistant screen in the lower part of the upper separator around the lower filter unit connection, a lower water-oil separator, said lower filter unit having a lower outlet connected with the lower water-oil separator, means to cool and settle the contents of the lower water-oil separator, a drain in the lower part of the lower water-oil separator, a clean oil outlet in the upper part of the lower water-oil separator connected with the intake of the pump, water-oil separator connected with the lower part of the upper separator for draining water therefrom, and a strainer in the lower water-oil separator over the clean oil outlet, said baffle being inverted cone shape and said means to cool and settle the contents of the lower water-oil separator being a cooling coil disposed in said separator with cooling water inlet and outlet connections extending from said separator, said means to heat the lower part of the upper separator being thermostatically controlled electric heaters extending in said separator, said filter units each having a plurality of vertically disposed filter bags nestled in and spaced from one another with the inlet opening of each filter unit being disposed over the center filter bag therein.

References Cited in the file of this patent

UNITED STATES PATENTS

| | | |
|---|---|---|
| 1,652,173 | Lalor | Dec. 3, 1927 |
| 2,555,607 | Robinson | June 5, 1951 |
| 2,660,309 | May | Nov. 24, 1953 |